(12) United States Patent
Yin et al.

(10) Patent No.: US 12,389,128 B2
(45) Date of Patent: Aug. 12, 2025

(54) DYNAMIC IMAGE GENERATING METHOD AND DYNAMIC IMAGE SENSOR THEREOF

(71) Applicant: Guangzhou Tyrafos Semiconductor Technologies Co., Ltd., Guangzhou (CN)

(72) Inventors: Ping-Hung Yin, Hsinchu (TW); Yung-Ming Chou, Hsinchu (TW)

(73) Assignee: Guangzhou Tyrafos Semiconductor Technologies Co., Ltd., Guangzhou (CN)

( * ) Notice: Subject to any disclaimer, the term of this patent is extended or adjusted under 35 U.S.C. 154(b) by 167 days.

(21) Appl. No.: 18/237,981

(22) Filed: Aug. 25, 2023

(65) Prior Publication Data
US 2024/0089608 A1  Mar. 14, 2024

(30) Foreign Application Priority Data
Sep. 8, 2022 (TW) .................................. 111134088

(51) Int. Cl.
*H04N 23/741* (2023.01)
*H04N 23/71* (2023.01)
*H04N 23/73* (2023.01)
*H04N 23/76* (2023.01)
*H04N 25/58* (2023.01)

(52) U.S. Cl.
CPC ........... *H04N 23/741* (2023.01); *H04N 23/73* (2023.01); *H04N 23/76* (2023.01); *H04N 25/58* (2023.01); *H04N 23/71* (2023.01)

(58) Field of Classification Search
None
See application file for complete search history.

(56) References Cited

U.S. PATENT DOCUMENTS

| | | | |
|---|---|---|---|
| 9,813,635 B2 * | 11/2017 | Richards | H04N 23/741 |
| 2002/0145674 A1 * | 10/2002 | Nakamura | H04N 23/73 348/E5.037 |
| 2015/0244916 A1 * | 8/2015 | Kang | H04N 23/741 348/222.1 |

* cited by examiner

*Primary Examiner* — Quan Pham

(57) ABSTRACT

The present invention relates to a dynamic image generating method and a dynamic image sensor thereof. The dynamic image sensor includes a first exposure pixel, a second exposure pixel and an image processing module. The dynamic image sensor applies the dynamic image generating method, which generates the default short-exposure image signal by exposing the first exposure pixel for default short-exposure time, and exposing the second exposure pixel for default long-exposure time to generate the default long-exposure image signal. The image processing module confirms whether the default short-exposure image and the default long-exposure image signals are between the lower and upper limits of pinching. If so, the optimal short-exposure time and the optimal long-exposure time are generated; otherwise, increase the default short-exposure time by a short-exposure fixed value or decrease the default long-exposure time by a long-exposure fixed value, and repeat until the optimal short-exposure and long-exposure times are obtained.

6 Claims, 16 Drawing Sheets

100E 112E 113E 111E          111E

| L | M | L | M | L | M | L | M |
|---|---|---|---|---|---|---|---|
| M | S | M | S | M | S | M | S |
| L | M | L | M | L | M | L | M |
| M | S | M | S | M | S | M | S |
| L | M | L | M | L | M | L | M |
| M | S | M | S | M | S | M | S |
| L | M | L | M | L | M | L | M |
| M | S | M | S | M | S | M | S |

12E — Image processing module

FIG. 15

DYNAMIC IMAGE GENERATING METHOD AND DYNAMIC IMAGE SENSOR THEREOF

CROSS-REFERENCE TO RELATED APPLICATION

This application claims the priority of Taiwanese patent application No. 111134088, filed on Sep. 8, 2022, which is incorporated herewith by reference.

BACKGROUND OF THE INVENTION

1. Field of the Invention

The present invention relates generally to a dynamic image generating method, and more particularly, to a dynamic image generating method with high detection rate and high dynamic range, and a dynamic image sensor thereof.

2. The Prior Arts

In recent years, the demand from the self-driving car industry has become increasingly vigorous. For self-driving cars, an image sensor for detecting real-time road conditions is an essential component. Currently, the dynamic vision sensor (DVS) is the mainstream image sensor used to detect real-time road conditions. This is because the DVS records image information in units of events. The dynamic event-based sensor brings machine autonomy closer to reality, making it suitable for vision-based high-speed applications in the field of autonomous vehicles.

However, during road driving, occasional situations where the illumination level changes sharply in a short period of time may occasionally cause the problem of partial or all temporary overexposure or underexposure of the image sensor. During this short period of time, the image recognition algorithm of the self-driving car cannot make correct object detection in the face of insufficient detail images, thus increasing the risk of accidents.

Therefore, how to optimize the image sensor so that the image sensor can quickly adjust the exposure level under a very high frame rate to generate the best exposure time, and through tone mapping and exposure fusion to produce high dynamic range images, so that the image details can provide sufficient clarity and recognition in the face of various illumination environments, which is one of the problems that developers need to solve urgently.

Therefore, the present invention is provided after observing the above-mentioned deficiency.

SUMMARY OF THE INVENTION

A primary objective of the present invention is to provide a dynamic image sensor, by exposing the first exposure pixel for a short-exposure time, while the second exposure pixel is exposed for a long-exposure time, and generating high dynamic range image information through tone mapping and exposure fusion. As such, the present invention utilizes the design of long- and short-exposure arrays to expose and fuse image information that is exposed at different times and with different exposure times within the same frame time, achieving the effects of enhancing the clarity and brightness of dynamic images to improve the accuracy of the identification algorithm for identification of dynamic images and reducing the risk of accidents.

Another objective of the present invention is to provide a dynamic image generating method, which is to increase the default short-exposure time by a short-exposure fixed value through the image processing module to form a new default short-exposure time, or to decrease the default long-exposure time by a long-exposure fixed value to form a new default long-exposure time, so as to generate the best short-exposure time and the best long-exposure time. As such, the present invention exchanges the spatial resolution for additional exposure information, which is beneficial to converge to the optimal exposure time in a short duration, so that the exposure of high dynamic range image information is good. In addition, through the calculation method of simultaneously pinching the upper and lower limits, the automatic exposure time method of the present invention can realize a dynamic calculation method to generate the optimal exposure time to adapt to various shooting environments, and at the same time reduce the calculation time for generating the optimal exposure time; thereby the efficiency and applicability of the present invention are greatly improved.

Another objective of the present invention is to provide a dynamic image generating method, which is to process the short-exposure image signal and the long-exposure image signal through binarization, multiplying the binarized short-exposure image signal by the short-exposure weight, and multiplying the binarized long-exposure image signal by the long-exposure weight, wherein the long-exposure weight is greater than the short-exposure weight. As such, the present invention solves the problem of unclear dynamic images in low-brightness environments, making the pixels with high brightness have higher values and those with low brightness lower, which increases the contrast of object outlines in the image and further improves the clarity of dynamic images.

In order to achieve the above objectives, the present invention provides a dynamic image generating method for images with a high frame rate and a high dynamic range, applicable to an environment where a dynamic image sensor receives a dynamic image in the dynamic range, and the dynamic image sensor includes a first exposure pixel, a second exposure pixel, and an image processing module, wherein the first exposure pixel and the second exposure pixel are coupled to the image processing module, the dynamic image generating method includes the following steps: a simultaneous exposure step, exposing the first exposure pixel for a short-exposure time to generate a short-exposure image signal, and exposing the second exposure pixel for a long-exposure time to generate a long-exposure image signal; a tone mapping step, the image processing module executing a tone mapping algorithm on the short-exposure image signal and the long-exposure image signal to generate a short-exposure image information and a long-exposure image information; an exposure fusion step, the image processing module executing exposure fusion on the short-exposure image information and the long-exposure image information to generate a high dynamic range image information; and an output step, the image processing module outputting the high dynamic range image information.

Preferably, according to the dynamic image generating method of the present invention, the tone mapping algorithm is selected from one of a gamma curve algorithm and an academy color encoding system curve algorithm.

Preferably, according to the dynamic image generating method of the present invention, before the simultaneous exposure step, the dynamic image generating method further includes an automatic exposure time method, and the automatic exposure time method includes the following steps: a test step, exposing the first exposure pixel for a default short-exposure time, and exposing the second exposure pixel for a default long-exposure time, so as to generate a default short-exposure image signal and a default long-exposure image signal; a determination step, the image processing module confirming whether the default short-exposure image signal being higher than a lower limit of pinching, and confirming whether the default long-exposure image signal being lower than an upper limit of pinching; an adjustment step, the image processing module increasing the default short-exposure time by a short-exposure fixed value to generate a new default short-exposure time, or decreasing the default long-exposure time by a long-exposure fixed value to generate a new default long-exposure time; an optimal exposure time generation step, the image processing module generating an optimal short-exposure time and an optimal long-exposure time according to the default short-exposure time and the default long-exposure time, wherein if the determination step determining that the default short-exposure image signal being higher than the lower limit of pinching, and the default long-exposure image signal being lower than the upper limit of pinching, executing the optimal exposure time generation step after the determination step, and in the simultaneous exposure step, exposing the first exposure pixel for the optimal short-exposure time, and simultaneously exposing the second exposure pixel for the optimal long-exposure time; otherwise, executing the adjustment step after the determining step and repeating the test step.

Preferably, according to the dynamic image generating method of the present invention, the dynamic image sensor stores a short-exposure time upper limit and a long-exposure time lower limit, the short-exposure time upper limit is the maximum value of the default short-exposure time, and the lower limit of the long-exposure time is the minimum value of the default long-exposure time.

Preferably, according to the dynamic image generating method of the present invention, if the default short-exposure time is equal to the short-exposure time upper limit, and the default short-exposure image signal is still lower than the lower limit of pinching in the determination step, the automatic exposure time method further includes a superposition step, in which the image processing module performs superposition on the default short-exposure image signal to generate the short-exposure image signal.

Preferably, according to the dynamic image generating method of the present invention, the dynamic image sensor further includes a brightness sensing module, coupled to the image processing module, the brightness sensing module is used to sense the brightness of the environment where the dynamic image sensor is located; the exposure time adjustment method further includes an upper and lower limit adjustment step, in which the image processing module adjusts the lower limit and the upper limit of the pinching according to the brightness sensed by the brightness sensing module; when the brightness sensed by the brightness sensing module is lower than a low-brightness value, the lower limit of pinching is correspondingly reduced, and when the brightness sensed by the brightness sensor module is higher than a high-brightness value, the upper limit of pinching will be raised accordingly.

Preferably, according to the dynamic image generating method of the present invention, the tone mapping step includes: a threshold value generation step, the image processing module taking an average of the pixel values of the short-exposure image signal to generate a short-exposure brightness threshold, and taking an average of the pixel values of the long-exposure image signal to generate a long-exposure brightness threshold; a high dynamic range synthesis step, the image processing module, according to the short-exposure brightness threshold, defining the pixel values higher than the short-exposure brightness threshold in the short-exposure image signal as 1, and defining the pixel values in the short-exposure image signal lower than or equal to the short-exposure brightness threshold as 0, the image processing module, according to the long-exposure brightness threshold, defining the pixel values in the long-exposure image signal higher than the long-exposure brightness threshold as 1, and defining the pixel values in the long-exposure image signal lower than or equal to the long-exposure brightness threshold as 0; a weighted calculation step, the image processing module multiplying the binarized short-exposure image signal by a short-exposure weight, and multiplying the binarized long-exposure image signal by a long-exposure weight, wherein the long-exposure weight being greater than the short-exposure weight.

Moreover, in order to achieve the above objectives, the present invention further provides a dynamic image sensor with a high frame rate and a high dynamic range based on the aforementioned dynamic image generating method, which is applied to an environment for receiving dynamic images in a dynamic range, wherein, the dynamic image sensor includes: a sensing array, further including a plurality of first exposure pixels and a plurality of second exposure pixels, the first exposure pixels having a short-exposure time, and the second exposure pixels having a long-exposure time; an image processing module, coupled to the sensing array; wherein, the first exposure pixels being exposed for the short-exposure time to generate a short-exposure image signal, and the second exposure pixels being exposed for the long-exposure time to generate a long-exposure image signal, the image processing module executing a tone mapping algorithm on the short-exposure image signal and the long-exposure image signal to generate a short-exposure image information and a long-exposure image information, and the image processing module performing exposure fusion on the short-exposure image information and the long-exposure image information to generate a high dynamic range image information.

Preferably, according to the dynamic image sensor of the present invention, wherein the first exposure pixels and the second exposure pixels are arranged alternately, and the number of the first exposure pixels is either equal to the number of the second exposure pixels, two times of the number of the second exposure pixels, or three times of the number of the second exposure pixels.

In summary, the dynamic image generating method provided by the present invention mainly utilizes the dynamic image sensor of the present invention to expose the first exposure pixels for a short-exposure time, while expose the second exposure pixels for a long-exposure time, and then generates high dynamic range image information through the tone mapping and exposure fusion. As such, the present invention utilizes the design of long- and short-exposure arrays to expose and fuse image information that is exposed at different times and with different exposure times within the same frame time, achieving the effects of enhancing the clarity and brightness of dynamic images, and greatly improving the accuracy of the identification algorithm for identification of dynamic images to reduce the risk of accidents. In addition, by the image processing module, the default short-exposure time is increased by a short-exposure fixed value to form a new default short-exposure time, or the default long-exposure time is reduced by a long-exposure fixed value to form a new default long-exposure time so as to generate the best short-exposure times as well as the best long-exposure times. As such, the present invention exchanges the spatial resolution for additional exposure information, which is beneficial to converge to the optimal exposure time in a short period of time, so that the exposure of high dynamic range image information is good.

In order to make those skilled in the art understand the purpose, features and effects of the present invention, the present invention is described in detail below by the following specific embodiments, and in conjunction with the attached drawings.

BRIEF DESCRIPTION OF THE DRAWINGS

FIG. 15 is a schematic view of a dynamic image sensor according to a fifth embodiment of the present invention.

DETAILED DESCRIPTION OF THE PREFERRED EMBODIMENT

Figure 1:
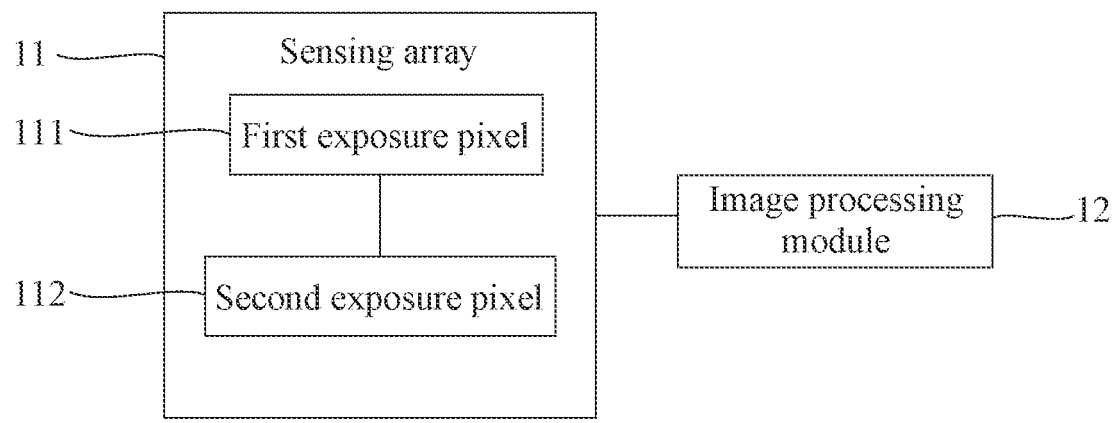
FIG. 1 is a schematic view of a dynamic image sensor according to the present invention.

The inventive concept will be explained more fully hereinafter with reference to the accompanying drawings in which exemplary embodiments of the inventive concept are shown. Advantages and features of the inventive concept and methods for achieving the same will be apparent from the following exemplary embodiments, which are set forth in more details with reference to the accompanying drawings. However, it should be noted that the present inventive concept is not limited to the following exemplary embodiments, but may be implemented in various forms. Accordingly, the exemplary embodiments are provided merely to disclose the inventive concept and to familiarize those skilled in the art with the type of the inventive concept. In the drawings, exemplary embodiments of the inventive concepts are not limited to the specific examples provided herein and are exaggerated for clarity.

The terminology used herein is used to describe particular embodiments only, and is not intended to limit the present invention. As used herein, the singular terms "a" and "the" are intended to include the plural forms as well, unless the context clearly dictates otherwise. As used herein, the term "and/or" includes any and all combinations of one or more of the associated listed items. It will be understood that when an element is referred to as being "connected" or "coupled" to another element, it can be directly connected or coupled to the other element or intervening elements may be present.

Similarly, it will be understood that when an element (e.g., a layer, region, or substrate) is referred to as being "on" another element, it can be directly on the other element or intervening elements may be present. In contrast, the term "directly" means that no intervening elements are present. It should be further understood that when the terms "comprising" and "including" are used herein, it is intended to indicate the presence of stated features, steps, operations, elements, and/or components, but does not exclude one or more other features, steps, operations, elements, components, and/or the presence or addition of groups thereof.

Furthermore, exemplary embodiments in the detailed description are set forth in cross-section illustrations that are idealized exemplary illustrations of the present inventive concepts. Accordingly, the shapes of the exemplary figures may be modified according to manufacturing techniques and/or tolerable errors. Therefore, the exemplary embodiments of the present inventive concept are not limited to the specific shapes shown in the exemplary figures, but may include other shapes that may be produced according to the manufacturing process. The regions illustrated in the figures have general characteristics and are used to illustrate specific shapes of elements. Therefore, this should not be considered limited to the scope of this creative concept.

It will also be understood that, although the terms "first," "second," "third," etc. may be used herein to describe various elements, these elements should not be limited by these terms. These terms are only used to distinguish each element. Thus, a first element in some embodiments could be termed a second element in other embodiments without departing from the teachings of the present creation. Exemplary embodiments of aspects of the present inventive concept illustrated and described herein include their complementary counterparts. Throughout this specification, the same reference numbers or the same designators refer to the same elements.

Furthermore, example embodiments are described herein with reference to cross-sectional and/or planar views, which are illustrations of idealized example illustrations. Accordingly, deviations from the shapes shown, for example, caused by manufacturing techniques and/or tolerances, are expected. Accordingly, the exemplary embodiments should not be considered limited to the shapes of the regions shown herein, but are intended to include deviations in shapes resulting from, for example, manufacturing. Thus, the regions illustrated in the figures are schematic and their shapes are not intended to illustrate the actual shape of a region of a device and are not intended to limit the scope of example.

Refer to FIG. 1, which is a schematic view of a dynamic image sensor according to the present invention. As shown in FIG. 1, a dynamic image sensor 100 according to the present invention includes: a sensing array 11 and an image processing module 12.

Specifically, the dynamic image sensor 100 according to the present invention may be a complementary metal-oxide-semiconductor (CMOS) image sensor, and may be selected from a back-illuminated CMOS image sensor or a front-illuminated CMOS image sensor, but the present invention is not limited thereto.

Specifically, as shown in FIG. 1, the sensing array 11 according to the present invention includes a plurality of first exposure pixels 111 and a plurality of second exposure pixels 112, the first exposure pixels 111 have a short-exposure time, and the second exposure pixels 112 have a long-exposure time. In some embodiments, each of the first exposure pixels 111 and the second exposure pixels 112 is a CMOS image pixel. More specifically, in some embodiments, the short-exposure time may be 256 times different from the long-exposure time, and the short-exposure time is at least one shutter speed of the shutter of the dynamic image sensor 100; however, the present invention is not limited thereto.

Specifically, in some embodiments, the dynamic image sensor 100 according to the present invention may have one of a rolling shutter mechanism and a global shutter mechanism. When the rolling shutter mechanism is used, the rolling shutter mechanism has a time difference in exposure. Therefore, when the dynamic image sensor 100 shoots a dynamic image, the exposure times of the upper and lower half of the image are different, which may cause the upper half of the image to appear first, but the lower half of the image has not yet appeared, and the time gap results in distortion and deformation in the image. In a preferred embodiment of the present invention, since the present invention is mainly aimed at generating dynamic images in the dynamic range, in order to avoid the jello effect of dynamic images, a global shutter mechanism is adopted; that is, on the sensor array 11, all the first exposure pixels 111 and the second exposure pixels 112 are simultaneously exposed to obtain image signals or image charges, but the present invention is not limited thereto.

It should be further explained that since the present invention relates to tone mapping of images exposed at different times and with different exposure times, the tone mapping will be described below first. Tone mapping refers to the conversion of lighting results from high dynamic range (HDR) image information to low dynamic range (LDR) image information that can be displayed normally on a display device. The present invention uses tone mapping to process the HDR image information in the original shooting scene where the difference between the maximum and minimum brightness values is within 106 orders of magnitude, with tone mapping algorithm, and then map to LDR (e.g. 8-bit) image information that is applicable to a hardware display device, while still retaining the color details and shading changes in the original shooting scene. Since the tone mapping algorithm is familiar to those skilled in the art, it will not be repeated herein.

It is worth mentioning that since the present invention relates to image exposure fusion with images exposed at different times and different exposure times, the exposure fusion will be described below first. The exposure fusion method involved in the present invention is based on the first exposure pixels 111 and the second exposure pixels 112, and the exposure fusion process generally includes four steps: preprocessing, transformation, synthesis and inverse transformation. Preprocessing generally refers to preparation operations before exposure fusion, which will not be repeated herein. The main methods of transformation in the exposure fusion process generally include Principal Component Analysis (PCA) method, HIS (Intensity-Hue-Saturation) transformation method, wavelet transformation method, multi-resolution method, such as Laplacian pyramid fusion algorithm, etc. one or a combination thereof. The synthesis in the exposure fusion process refers to the comprehensive processing of the transformation results of the image signals generated by the first exposure pixels 111 and the second exposure pixels 112. There are many processing methods for the comprehensive processing, such as, selection method, weighted average method, and optimization; wherein the selection method is to select the corresponding transformation coefficients from the original image sequence to form a new set of transformation coefficients, and the weighted average method is to determine the weight of the transformation coefficients corresponding to the image signal according to specific rules, and through the weighted average calculation to produce new coefficients. The inverse transformation in the exposure fusion process refers to the corresponding inverse operation of the new transformation coefficients of the integrated image signal, for example, the radiance map is reversed from the existing image to generate the final fused image.

Specifically, as shown in FIG. 1, the image processing module 12 of the present invention is coupled to the sensing array 11, and the image processing module 12 is mainly used to execute an algorithm. In some embodiments, the algorithm includes a tone mapping algorithm, and the tone mapping algorithm can be selected from one of the gamma curve algorithm and the academy color encoding system curve algorithm. More specifically, the image processing module 12 may include one or a combination of a server, a personal computer, and an application specific integrated circuit (ASIC), but the present invention is not limited thereto.

Figure 2:
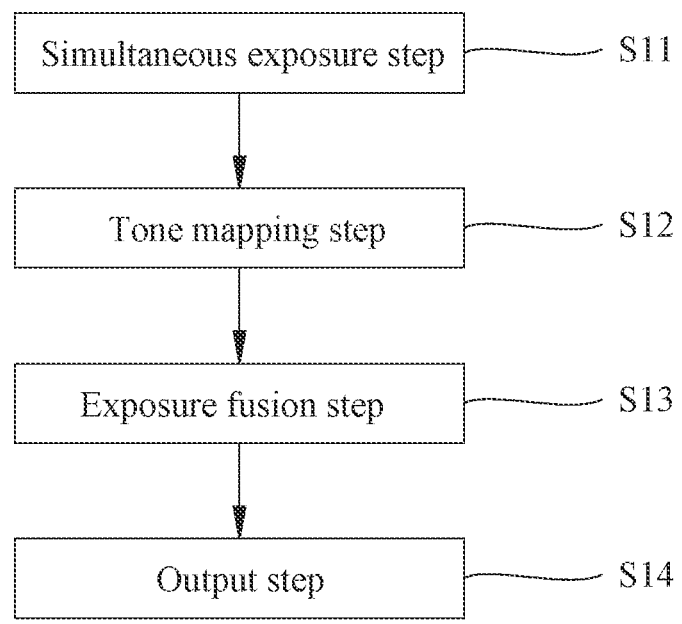
FIG. 2 is a block diagram illustrating the steps of the dynamic image generating method of the present invention.

For further understanding of the present invention's structural features, the use of technical means and the expected effect, the use of the present invention will be described, and it is believed that the present invention can be understood more deeply and specifically. Refer to FIG. 2, which is a block diagram illustrating the steps of the dynamic image generating method of the present invention. The method for generating dynamic images with high frame rate and high dynamic range according to the present invention comprises the following steps:

In the simultaneous exposure step S11, the first exposure pixel 111 is exposed for a short-exposure time to generate a short-exposure image signal, the second exposure pixel 112 is exposed for a long-exposure time to generate a long-exposure image signal, and then the tone mapping step S12 is performed.

In the tone mapping step S12, the image processing module 12 executes the tone mapping algorithm on the short-exposure image signal and the long-exposure image signal to generate short-exposure image information and long-exposure image information, and then executes the exposure fusion step S13.

In the exposure fusion step S13, the image processing module 12 performs exposure fusion on the short-exposure image information and the long-exposure image information to generate high dynamic range image information, and then executes the output step S14.

In the outputting step S14, the image processing module 12 outputs the high dynamic range image information.

Figure 3:
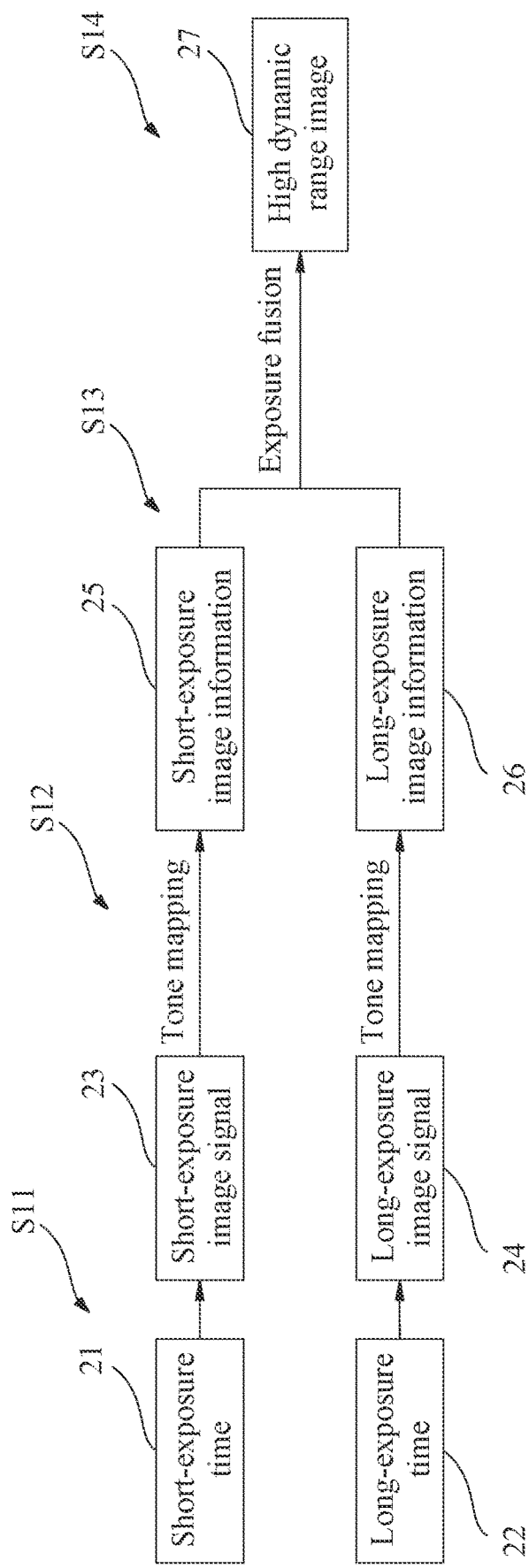
FIG. 3 is a flowchart illustrating the steps of the actual execution process of the dynamic image generating method according to the present invention.

For further understanding of the present invention's structural features, the use of technical means and the expected effect, the actual implementation process of the first embodiment of the present invention will be described, and it is believed that the present invention can be understood more deeply and specifically, As described below:

Referring to FIG. 3, and as shown in FIG. 1 and FIG. 2, FIG. 3 is a flowchart illustrating the actual execution process of the dynamic image generation method according to the present invention. The actual execution process of the dynamic image sensor 100 according to the present invention is described as follows: First, the simultaneous exposure step S11 is performed, the first exposure pixel 111 is exposed for a short-exposure time 21 to generate a short-exposure image signal 23, and at the same time the second exposure pixel 112 is exposed for a long-exposure time 22 to generate a long-exposure image signal 24; then, the tone mapping step S12 is executed, wherein the image processing module 12 executes the tone mapping algorithm on the short-exposure image signal 23 and the long-exposure image signal 24 to generate short-exposure image information 25 and long-exposure image information 26; afterward, the exposure fusion step S13 is executed, wherein the image processing module 12 performs exposure fusion on the short-exposure image information 25 and the long-exposure image information 26 to generate high dynamic range image information 27; and finally, the output step S14 is executed, wherein the image processing module 12 outputs the high dynamic range image information 27.

Thus, it can be seen from the above description that the dynamic image generation method according to the present invention exposes the first exposure pixel 111 for the short-exposure time 21, and exposes the second exposure pixel 112 for the long-exposure time 22, and then uses the tone mapping and exposure fusion to produce high dynamic range image information 27. As such, the present invention utilizes the design of the long- and short-exposure arrays to perform exposure and fusion of image information within one frame, thereby achieving effects such as enhancing the definition and brightness of dynamic images.

Hereinafter, with reference to the drawings, the embodiment of the first embodiment of the dynamic image sensor 100 of the present invention will be described, so that those skilled in the art of the present invention can understand possible changes more clearly. Components denoted by the same reference numerals as above are substantially the same as those described above with reference to FIG. 1. The same components, features, and advantages as those of the dynamic image sensor 100 will not be repeated.

Figure 4:
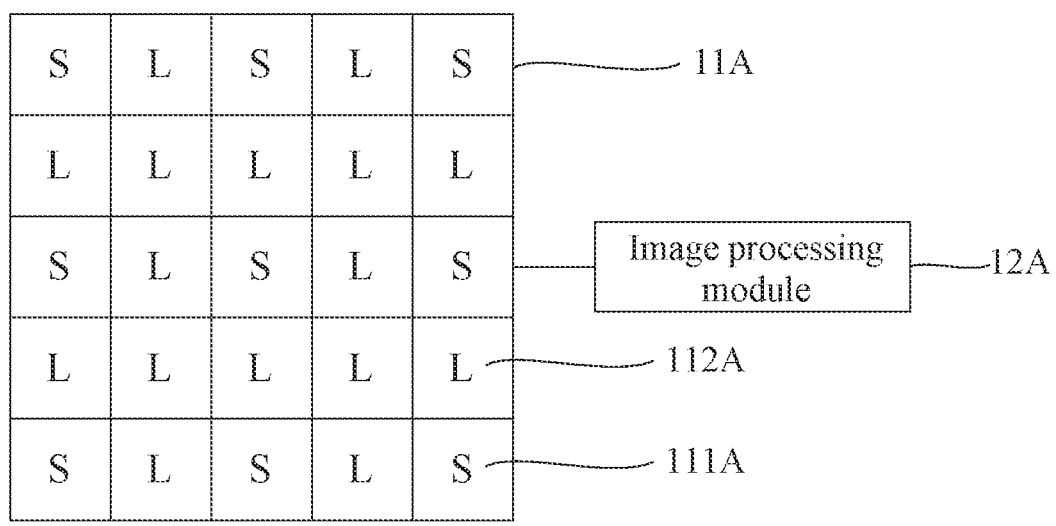
FIG. 4 is a schematic view of a dynamic image sensor according to a first embodiment of the present invention.

Refer to FIG. 4, which is a schematic view of a dynamic image sensor according to the first embodiment of the present invention. As shown in FIG. 4, the dynamic image sensor 100A according to the first embodiment of the present invention includes: a sensing array 11A and an image processing module 12A.

Specifically, as shown in FIG. 4, in the present embodiment, the sensing array 11A according to the present invention includes a plurality of first exposure pixels 111A and a plurality of second exposure pixels 112A, and the first exposure pixels 111A and the second exposure pixels 112A are arranged in a staggered manner, and the number of the first exposure pixels 111A and the number of the second exposure pixels 112A are equal. The first exposure pixels 111A have a short-exposure time, the second exposure pixels 112A have a long-exposure time, and the long-exposure time can be one of 2 times, 4 times, or 8 times of the short-exposure time, but the present invention is not limited thereto. It can be understood that the staggered arrangement of the first exposure pixels 111A and the second exposure pixels 112A can ensure that each block of the dynamic image generated by the dynamic image sensor 100A of the present invention has the same long-exposure time and short-exposure times. In addition, the number of the first exposure pixels 111A and the second exposure pixels 112A in the sensing array 11A of the present invention, as well as the relationship between the long-exposure time and the short-exposure time can be determined according to the environment in which the dynamic image sensor 100A is used. For example, when the dynamic image sensor 100A is used in a brighter environment, the number of the first exposure pixels 111A with a short-exposure time may be less than the second exposure pixels 112A with a long-exposure time, and the long-exposure time may have a higher multiple than the short-exposure time to ensure that the dynamic image generated by the dynamic image sensor 100A has better clarity and brightness, but the invention is not limited thereto.

It should be further explained that, in the present embodiment, the tone mapping algorithm of the image processing module 12A is selected from one of the gamma curve algorithm and the academy color encoding system curve S algorithms, but the present invention is not limited thereto.

It is worth mentioning that in the present embodiment, the image processing module 12A can store a pinch upper limit and a pinch lower limit, wherein the pinch upper limit can represent the threshold for judging overexposure, the pinch lower limit may represent a threshold for judging underexposure, and the image signal and the pinch lower limit may be, for example, a digital number (DN) value or a value converted therefrom. For example, when the image processing module 12A increases the exposure time to the maximum, but the to-be-tested image signal is still lower than the lower limit of pinching, the image processing module 12A can determine that the current environment is too dark. The image processing module 12A can then perform image superposition through the to-be-tested image signal to generate a brighter and more detailed image signal, but the present invention is not limited thereto.

It is worth mentioning that, in the present embodiment, the image processing module 12A can store a long-exposure fixed value and a short-exposure fixed value, and the user can also adjust the setting of long-exposure fixed value and short-exposure fixed value according to the brightness of the current environment through the image processing module 12A. For example, when the environment is brighter, the short-exposure fixed value can have a larger value and the long-exposure fixed value can have a smaller value, so as to generate the optimal exposure time faster and effectively save the dynamic image sensor the number of operation iterations and the time of image capturing performed by the device 100A to generate the optimal exposure time so as to effectively save the power of the electronic device.

Figure 5:
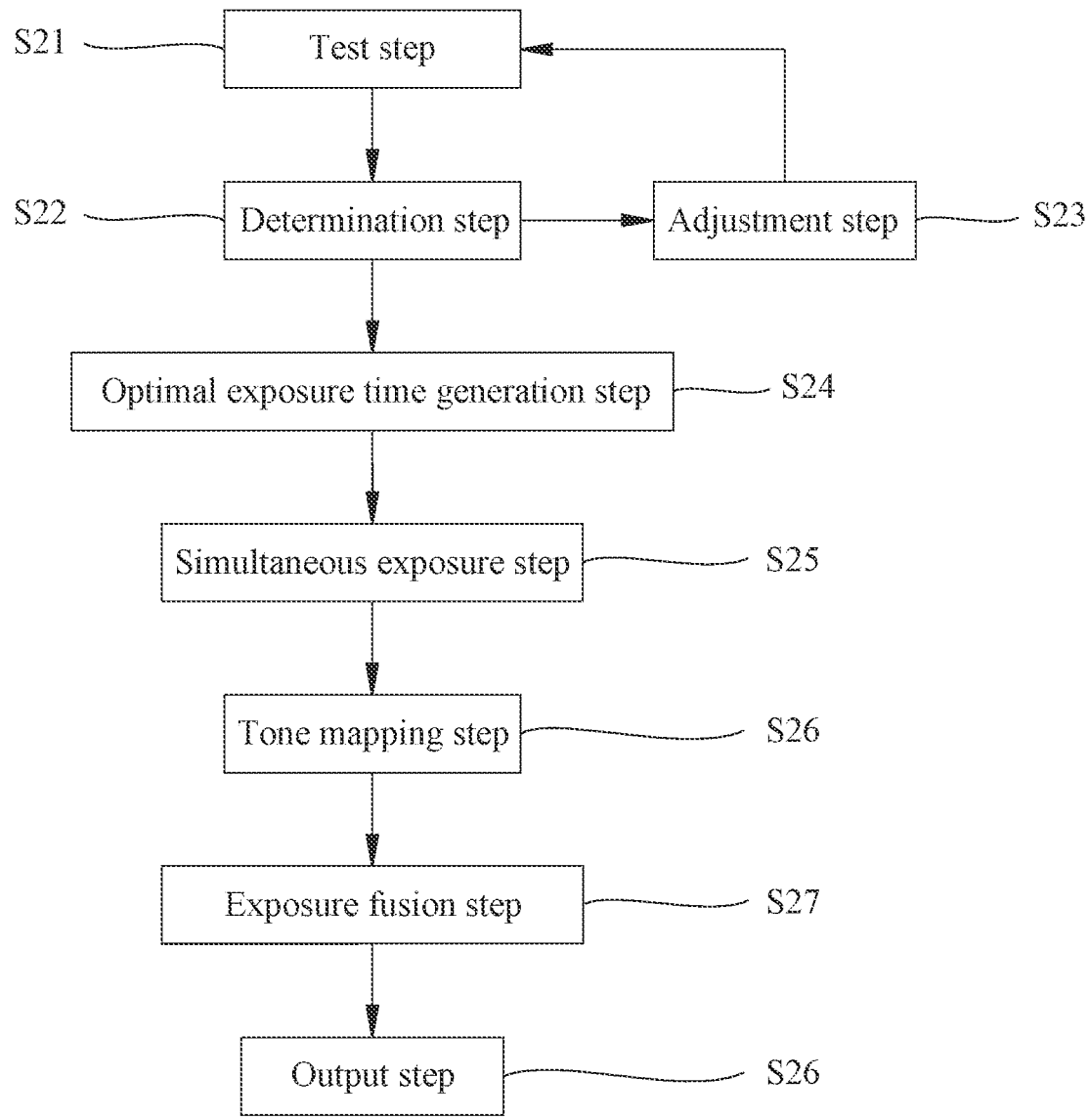
FIG. 5 is a block diagram illustrating the steps of the dynamic image generating method according to the first embodiment of the present invention.

Referring to FIG. 5, FIG. 5 is a block diagram illustrating the steps of the dynamic image generating method according to the first embodiment of the present invention. The present invention is based on the dynamic image sensor 100A of the first embodiment, and further provides a dynamic image generating method for implementing the dynamic image sensor 100 of the first embodiment, which includes the following steps:

Test step S21, the first exposure pixel 111A is exposed for a default short-exposure time, and the second exposure pixel 112A is exposed for a default long-exposure time to generate a default short-exposure image signal and a default long-exposure image signal, and then the determination step S22 is executed.

In the determination step S22, the image processing module 12A confirms whether the default short-exposure image signal is higher than a pinch lower limit, and confirms whether the default long-exposure image signal is lower than a pinch upper limit.

In the adjustment step S23, image processing module 12A increases the default short-exposure time by a short-exposure fixed value, or reduces the default long-exposure time by a long-exposure fixed value to form a new default short-exposure time and a new default long-exposure time.

In the optimal exposure time generation step S24, the image processing module 12A generates an optimal short-exposure time and an optimal long-exposure time according to the default short-exposure time and the default long-exposure time.

In the simultaneous exposure step S25, the first exposure pixel 111A is exposed for an optimal short-exposure time to generate a short-exposure image signal, the second exposure pixel 112A is exposed for an optimal long-exposure time to generate a long-exposure image signal, and then the tone mapping step S26 is executed.

In the tone mapping step S26, the image processing module 12A performs the tone mapping algorithm on the short-exposure image signal and the long-exposure image signal to generate short-exposure image information and long-exposure image information, and then the exposure fusion step S27 is executed.

In the exposure fusion step S27, the image processing module 12A performs exposure fusion on the short-exposure image information and the long-exposure image information to generate high dynamic range image information, and then the output step S28 is executed.

In the output step S28, the image processing module 12A outputs the high dynamic range image information.

Figure 6:
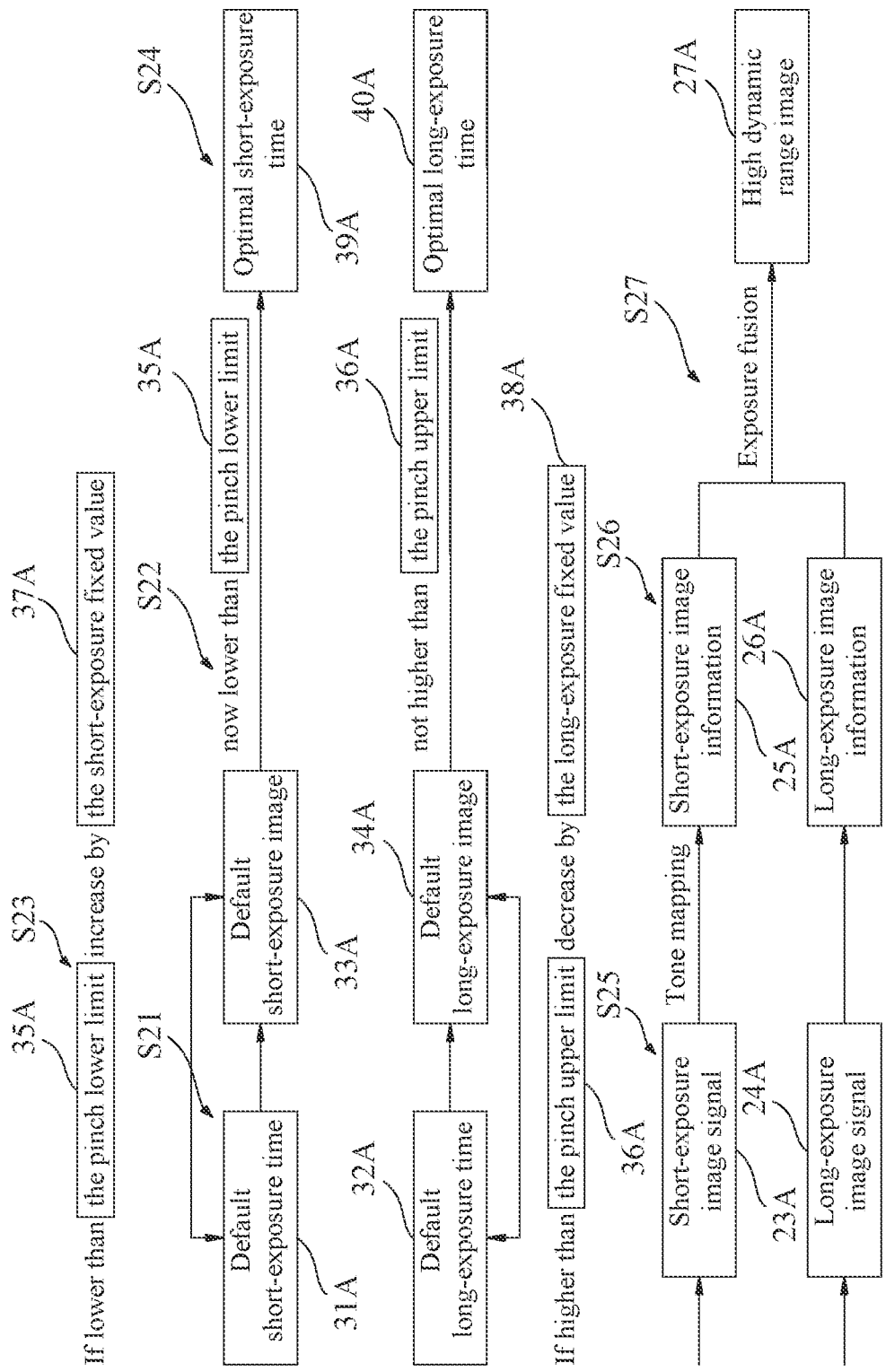
FIG. 6 is a flowchart illustrating the steps of the actual execution process of the dynamic image generating method according to the first embodiment of the present invention.

For further understanding of the present invention's structural features, use of technical means and the expected effect, the actual implementation process of the first embodiment of the present invention will be described, and it is believed that the present invention can be understood more deeply and specifically, as described below:

Referring to FIG. 6, and with FIG. 4 and FIG. 5, FIG. 6 is a flowchart illustrating the actual execution process of the dynamic image generating method according to the first embodiment of the present invention. The actual execution process of the dynamic image sensor 100A according to the first embodiment of the present invention is described as follows: First, the test step S21 is executed, the first exposure pixel 111A is exposed for the default short-exposure time 31A, and the second exposure pixel 112A is exposed for the default long-exposure time 32A to generate the default short-exposure image signal 33A and the default long-exposure image signal 34A. Then, the determination step S22 is executed, and the image processing module 12A confirms whether the default short-exposure image signal 33A is higher than the pinch lower limit 35A, and confirms whether the default long-exposure image signal 34A is lower than the pinch upper limit 36A; wherein, if the determination step S22 determines that the default short-exposure image signal 33A is lower than the pinch lower limit 35A, or the default long-exposure image signal 34A is higher than the pinch upper limit 36A, the adjustment step S23 is executed, wherein the image processing module 12A increases the default short-exposure time 31A by the short-exposure fixed value 37A to form a new default short-exposure time 31A, or decreases the default long-exposure time 32A by a long-exposure fixed value 38A to form a new default long-exposure time 32A, and return to the test step S21.

If the determination step S22 determines that the default short-exposure image signal 33A is higher than the pinch lower limit 35A, or the default long-exposure image signal 34A is lower than the pinch upper limit 36A, the optimal exposure time generation step S24 is executed, and the image processing module 12A, according to the default short-exposure time 31A and the default long-exposure time 32A, generates the optimal short exposure time 39A and the optimal long exposure time 40A. After that, the simultaneous exposure step S25 is performed, and the first exposure pixel 111 is exposed for the optimal short-exposure time 39A to generate the short-exposure image signal 23A, the second exposure pixel 112 is exposed for the optimal long-exposure time 40A to generate the long-exposure image signal 24A. Then, the tone mapping step S26 is executed, wherein the image processing module 12A executes the tone mapping algorithm to convert the short-exposure image signal 23A and the long-exposure image signal 24A into short-exposure image information 25A and long-exposure image information 26A. After that, exposure fusion step S27 is executed, wherein the image processing module 12A performs exposure fusion on the short-exposure image information 25A and the long-exposure image information 26A to generate high dynamic range image information 27A; and finally, the output step S4028 is executed, and the image processing module 12A outputs the high dynamic range image information 27A.

Figure 7:
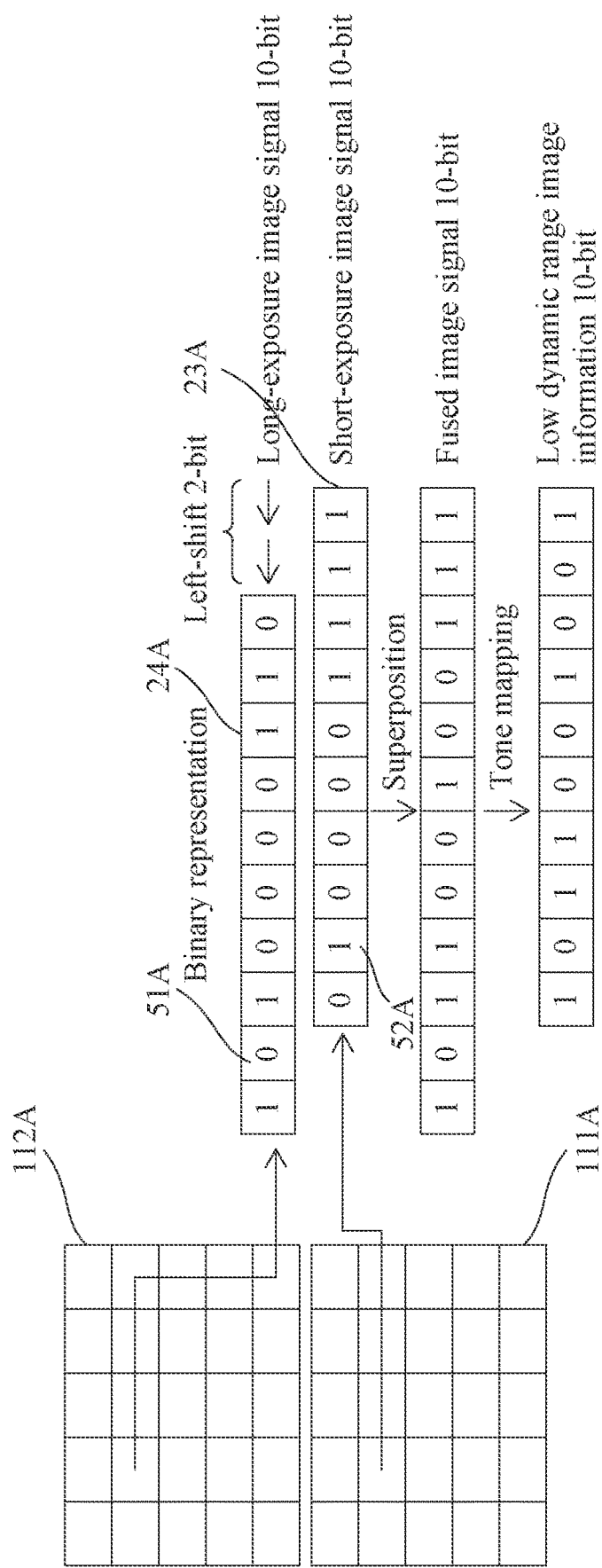
FIG. 7 is a schematic view illustrating a tone mapping algorithm according to the first embodiment of the present invention.

For further explanation, refer to FIG. 7, which is a schematic view illustrating the tone mapping algorithm according to the first embodiment of the present invention. As shown in FIG. 7, together with FIG. 5 and FIG. 6, FIG. 7 is a schematic view of a single pixel of the short-exposure image signal 23A and the long-exposure image signal 24A generated after the test step S21 to adjustment from the optimal exposure time generation step S24. Before executing the tone mapping, in the present embodiment, the pixel values 51A of the short-exposure image signal 23 and the long-exposure image signal 24A are partially superimposed and calculated (shown as two digits for example in FIG. 7), a higher weight is given to the long-exposure image signal 24A when performing superposition. in FIG. 7, an exemplary representation of 4 times the weight is used, that is, the operation of shifting two bits to the left in binary representation. Therefore, the higher the pixel value 51A of the long-exposure image signal 24A will be higher, and the pixel value 51A of the short-exposure image signal 23A will be lower, thus achieving the effect of high dynamic range image information. As shown in FIG. 7, the superimposed short-exposure image signal 23 and long-exposure image signal 24A are then subjected to tone mapping algorithms, for example, by global tone mapping functions such as Gamma curve and ACES curve, or other methods that consider local pixel characteristics, such as Reinhard tone mapping, to map high dynamic range image information back to low dynamic range image information. In the present embodiment, the tone mapping algorithm is simply a linear transformation, but the invention is not limited thereto.

It is worth mentioning that the dynamic image sensor according to the present invention can store a short-exposure time upper limit (not shown) and a long-exposure time lower limit (not shown), wherein the short-exposure time upper limit is the maximum value of the default short-exposure time 31A, and the long-exposure time lower limit is the minimum value of the default long-exposure time 32A. It can be understood that because of the limitation of the hardware of different dynamic image sensors, the upper limit of the short-exposure time represents the upper limit of the short-exposure time 31A of the first exposure pixel 111A on the hardware, and the lower limit of the long-exposure time 32A represents the lower limit of the long-exposure time of the second exposure pixel 112A on the hardware. As such, the dynamic image generating method of the first embodiment of the present invention, through the optimal short-exposure time 39A and the optimal long-exposure time 40A, achieves the objective of the distribution probability of the short-exposure image signal 23A and the long-exposure image signal 24A of each frame to be as close as possible. Also, through the upper limit of the short-exposure time and the lower limit of the long-exposure time, it is ensured that the distance between the distribution center, for example, average or median, of the short-exposure image signal 23A and the long-exposure image signal 24A is not too close. It can be understood that when the values of the optimal short-exposure time 39A and the optimal long-exposure time 40A are closer, the technical effect of the present invention will be reduced, and it is not conducive to the subsequent exposure fusion calculation.

Thus, it can be seen from the above description that according to the dynamic image generating method and the dynamic image sensor 100A according to the first embodiment of the present invention, the default short-exposure time 31A can be increased by the short-exposure fixed value 37A by the image processing module 12A until the upper limit of the short-exposure time is reached, or the default long-exposure time 32A is reduced by the long-exposure fixed value 38A until the lower limit of the long-exposure time is reach, so as to produce the best short-exposure time 39A and the best long-exposure time 40A. As such, the present invention exchanges the spatial resolution for additional exposure information, which is beneficial to converge to the optimal exposure time in a short period of time, so that the high dynamic range image information 27A is good. In addition, through the computing method of pinching, the automatic exposure time method of the present invention can realize a dynamic calculation method to generate the optimal exposure time to adapt to various shooting environments, and at the same time reduce the computing time for generating the optimal exposure time, which greatly improves the cost, efficiency and applicability of the invention.

The following provides other exemplars of the dynamic image sensor 100, so that those skilled in the art of the present invention can more clearly understand possible changes and modifications. Components indicated by the same reference numerals as in the above embodiment are substantially the same as those described above with reference to FIGS. 1 to 7. The same components, features, and advantages as those of the dynamic image sensor 100 will not be repeated.

Figure 8:
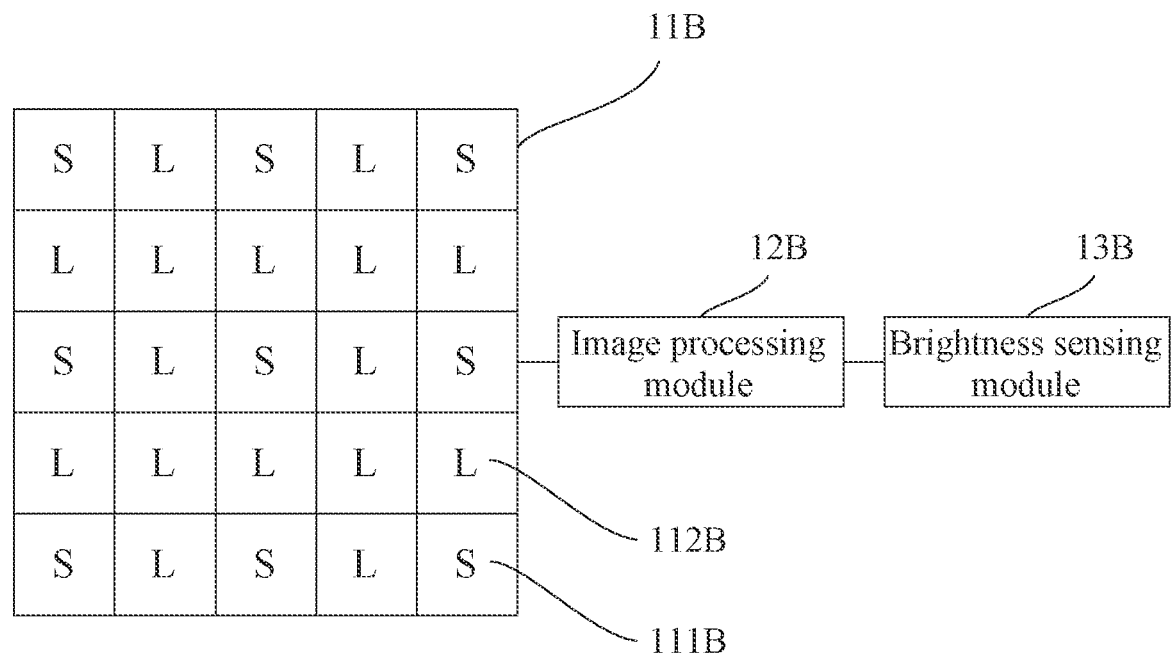
FIG. 8 is a schematic view of a dynamic image sensor according to a second embodiment of the present invention.

Refer to FIG. 8, which is a schematic view of a dynamic image sensor according to a second embodiment of the present invention. As shown in FIG. 8, the dynamic image sensor 100B according to the present invention includes: a sensing array 11B, an image processing module 12B, and a brightness sensing module 13B.

Specifically, the dynamic image sensor 100B according to the second embodiment of the present invention further includes a brightness sensing module 13B, and the brightness sensing module 13B according to the second embodiment of the present invention is coupled to the image processing module 12B and used for sensing the brightness of the environment where the dynamic image sensor 100B is located, so that the image processing module 12B can adjust the lower limit and the upper limit of pinching based on the brightness sensed by the brightness sensing module 13B. When the brightness sensed by the brightness sensing module 13B is low, the lower limit of pinching is correspondingly reduced. When the brightness sensing module 13B senses a high brightness, the corresponding upper limit of pinching is raised, but the present invention is not limited thereto.

Figure 9:
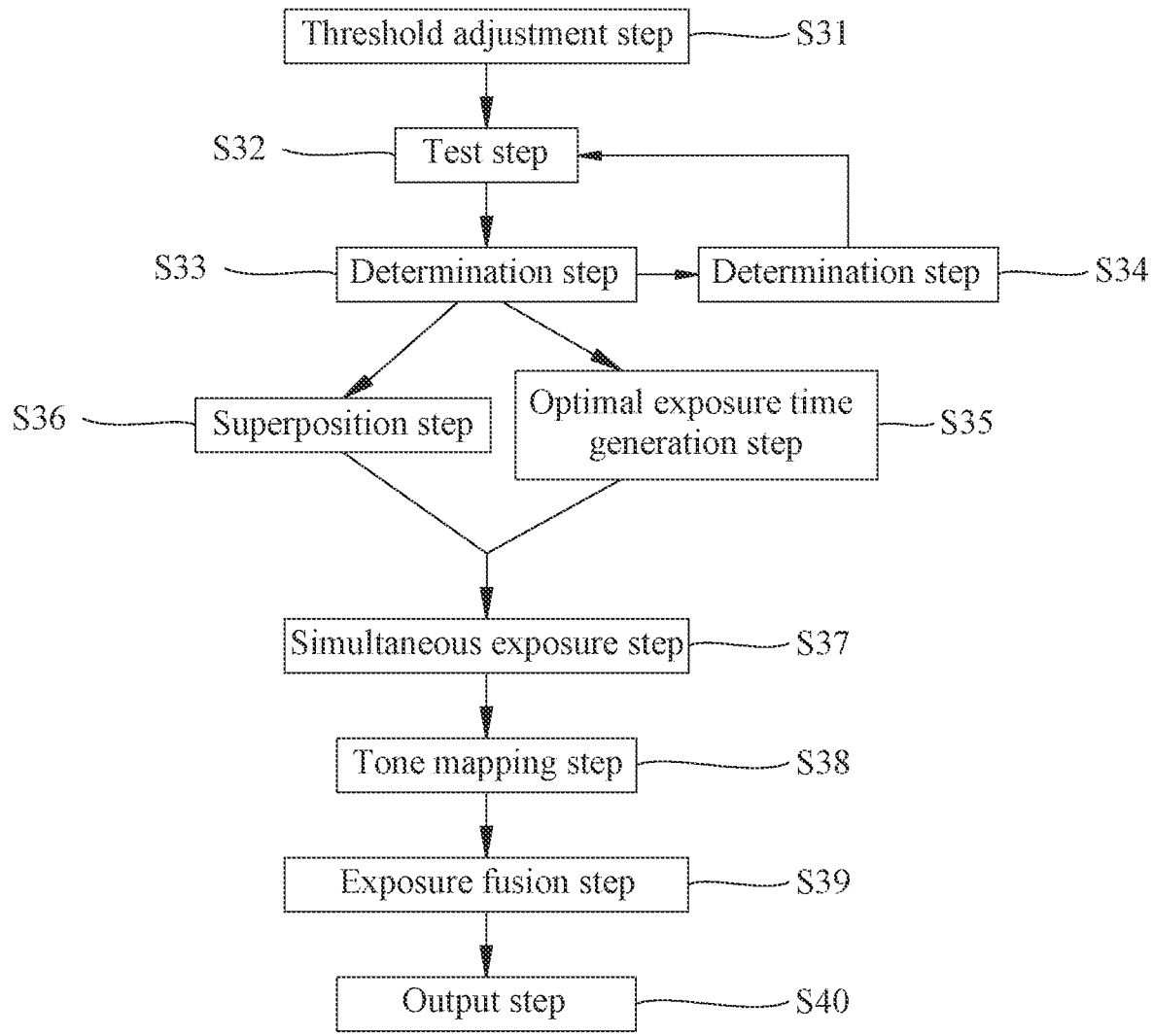
FIG. 9 is a block diagram illustrating the steps of the dynamic image generating method according to the second embodiment of the present invention.
Figure 10:
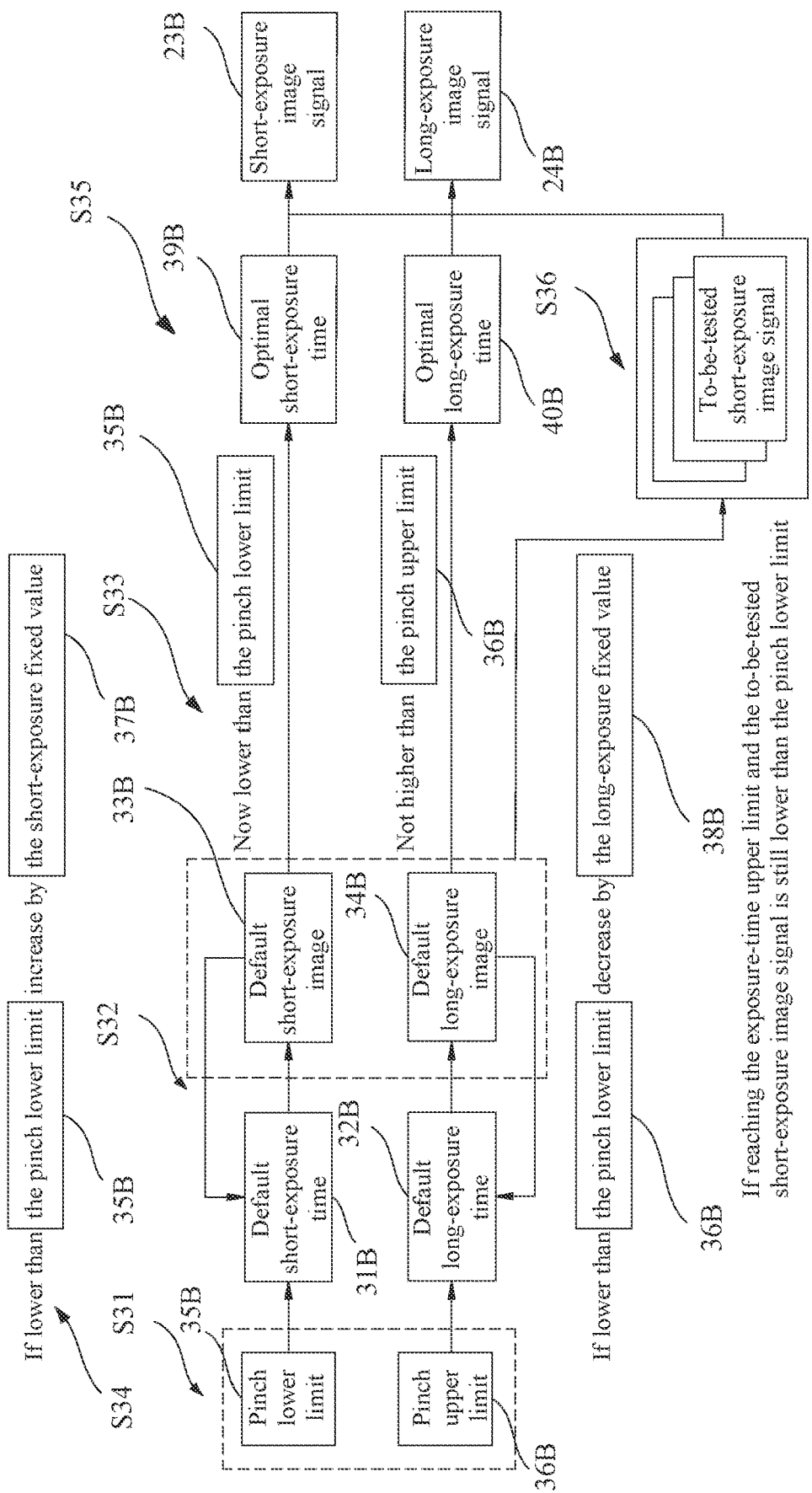
FIG. 10 is a flowchart illustrating the actual execution process of the superposition step according to the second embodiment of the present invention.

Refer to FIGS. 9 and 10. FIG. 9 is a block diagram illustrating the steps of implementing the dynamic image generating method according to the second embodiment of the present invention; FIG. 10 is illustrating flowchart of the actual implementation of the superposition step according to the second embodiment of the present invention. According to the present invention, based on the dynamic image sensor 100B of the second embodiment, a dynamic image generating method for the dynamic image sensor 100B of the second embodiment is further provided, which includes the following steps:

In the threshold adjustment step S31, the image processing module 12B adjusts the pinch lower limit 35B and the pinch upper limit 36B according to the brightness sensed by the brightness sensing module 13B. When the brightness sensed by the brightness sensing module is lower than the low brightness value (not shown), the pinch lower limit 35B is lowered correspondingly; when the brightness sensed by the brightness sensing module is higher than the high brightness value (not shown), the pinch upper limit 36B is raised correspondingly, and then the test step S32 is executed.

In the test step S32, the first exposure pixel 111B is exposed for the default short-exposure time 31B, and the second exposure pixel 112A is exposed for the default long-exposure time 32B to generate the default short-exposure image signal 33B and the default long-exposure image signal 34B, then the determination step S33 is executed.

In the determination step S33, the image processing module 12B confirms whether the default short-exposure image signal 33B is higher than the pinch lower limit 35B, and whether the default long-exposure image signal 32B is lower than the pinch upper limit 36B.

In the adjustment step S34, the image processing module 12B increases the default short-exposure time 31B by the short-exposure fixed value 37B, or reduces the default long-exposure time 32B by the long-exposure fixed value 38B to form the new default short-exposure time 31B and the to-be-tested new long-exposure time 32B.

In the optimal exposure time generation step S35, the image processing module 12B generates the optimal short-exposure time 39B and the optimal long-exposure time 40B according to the default short-exposure time 31B and the default long-exposure time 32B.

In the superposition step S36, the image processing module 12B superimposes the generated short-exposure image signal 33B or the generated short-exposure image signal 31B to the long-exposure image signal 32B to generate short-exposure image signal 23B, and the simultaneous exposure step S37 is executed.

In the simultaneous exposure step S37, the second exposure pixel 112B is exposed for an optimal long-exposure time to generate a long-exposure image signal, and then the tone mapping step S38 is executed.

In the tone mapping step S38, after performing the simultaneous exposure step S37, the image processing module 12B executes the tone mapping algorithm on the short-exposure image signal 23B and the long-exposure image signal 24B to generate short-exposure image information and long-exposure image information respectively; after executing the optimal exposure time generation step S35, the first exposure pixel 111A is exposed for the optimal short-exposure time to generate a short-exposure image signal 23B, and the second exposure pixel 112A is exposed for the optimal long-exposure time to generate a long-exposure image signal, and then the exposure fusion step S39 is executed.

In the exposure fusion step S39, the image processing module 12B performs exposure fusion on the short-exposure image information and the long-exposure image information to generate high dynamic range image information, and then the output step S14' is executed.

In the output step S40, the image processing module 12B outputs the high dynamic range image information.

It should be further explained that the low brightness value according to the present invention represents an environment under low illumination, which may easily cause underexposure of the image, and the low brightness value may be 1 lux. In addition, the high brightness value according to the present invention represents being in a high luminance or high brightness environment, which may easily cause image overexposure. The high brightness value may be 1000 lux, but the present invention is not limited thereto.

Specifically, refer to FIG. 10. Compared with the first embodiment, the dynamic image generating method according to the second embodiment of the present invention further includes a superposition step S36. If the default short-exposure time 31B is the upper limit of the short-exposure time, and if the default short-exposure image signal 33B is still lower than the pinch lower limit 35B in the determination step S33, the superposition step S36 is executed according to the second embodiment of the present invention for the image processing module 12B to superimpose the generated short-exposure image signal 33B or the generated short-exposure image signal 31B to the long-exposure image signal 32B to generate the short-exposure image signal 23B, so as to enhance the clarity and brightness of the dynamic image. In addition, refer to formula 1 below. When the shot noise caused by photoelectrons in the image signal is the main component of the noise, the relationship between the number $n_{photon}$ of electrons causing shot noise and the number $N_{signal}$ of electrons in the image signal is as shown in formula (1), wherein N represents the number of electrons in the image signal, $\bar{N}$ represents the number of electrons in shot noise, and $<(N-\bar{N})^2>$ represents the $(N-\bar{N})^2$ in diagonal brackets taking an average of values in each time. Refer to the formula (2) below. since the shot noise conforms to the Poisson distribution, and since the Poisson distribution tends to the normal distribution when there are a large number of particles, the standard deviation of the shot noise is now equal to the square root of the average number of particles, that is, the variance is equal to its average value, so that the equality of the formula 2 is established. Refer to formula (3) below, according to the formula of signal-to-noise ratio (SNR) and substituting into formula (1) and formula (2), the equation of formula (3) is established. It can be understood that, according to formulas (1)-(3), the signal-to-noise ratio is proportional to the number of electrons in the image signal. Therefore, the method of superimposing the short-exposure image signal 33B and the long-exposure image signal 34B to generate the short-exposure image signal 23B can realize the effect of reducing the signal-to-noise ratio, but the present invention is not limited thereto.

$$n_{photon}^2 \simeq n_{shot}^2 = <(N-\bar{N})^2> \qquad (1)$$

$$<(N-\bar{N})^2> = \bar{N} \simeq N_{signal} \qquad (2)$$

$$SNR = 20\log\frac{N_{signal}}{n_{shot}} = 20\log\frac{N_{signal}}{\sqrt{N_{signal}}} = 20\log\sqrt{N_{signal}} \qquad (3)$$

Figure 11:
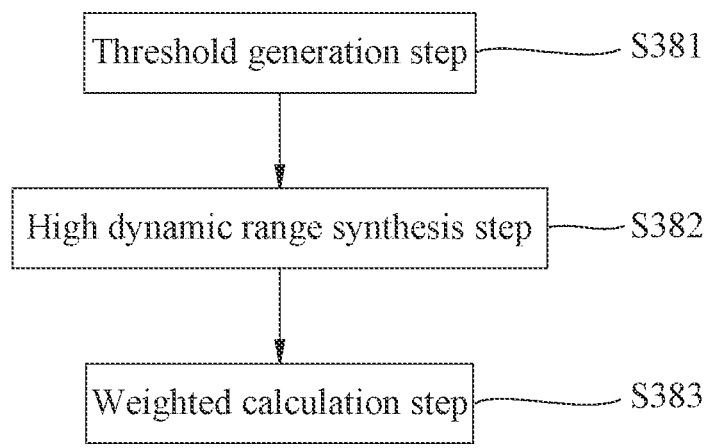
FIG. 11 is a block diagram illustrating a tone mapping step according to the second embodiment of the present invention.
Figure 12:
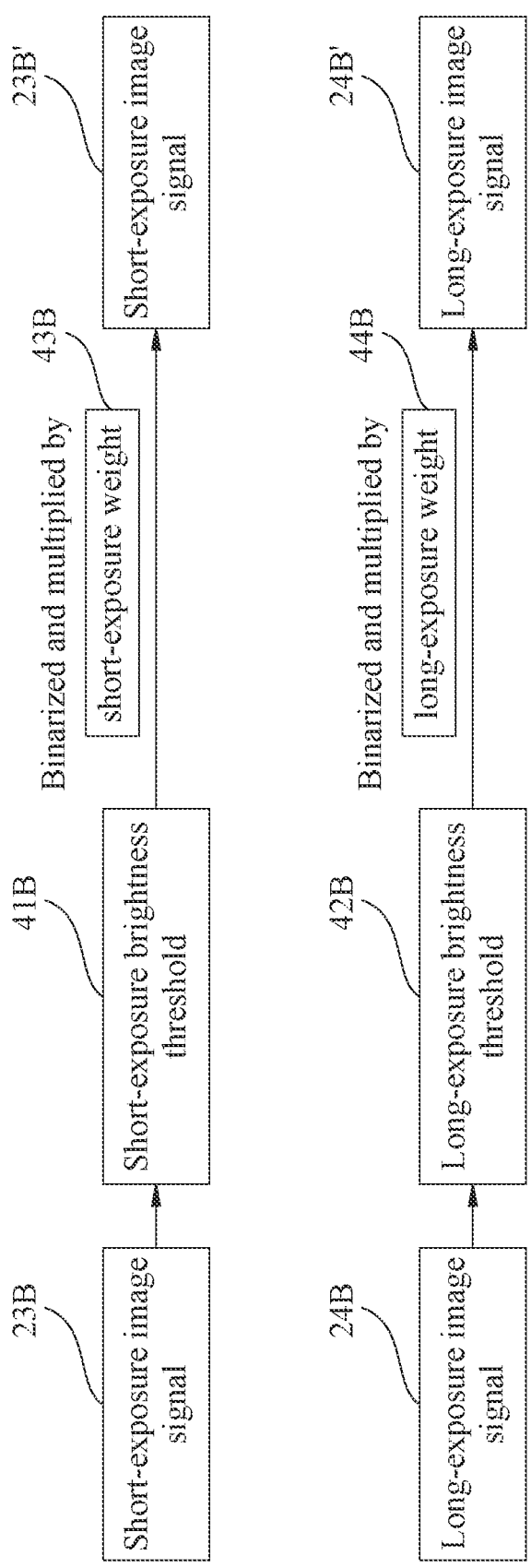
FIG. 12 is a flowchart illustrating the actual execution of the tone mapping step according to the second embodiment of the present invention.

Refer to FIG. 11 and FIG. 12. FIG. 11 is a block diagram illustrating the tone mapping step according to the second embodiment of the present invention; FIG. 12 is a flowchart illustrating the actual execution process of the tone mapping step according to the second embodiment of the present invention. According to the second embodiment of the present invention, the dynamic image sensor 100 actually executes the steps of tone mapping as follows: First, execute the threshold generation step S381, the image processing module 12B takes the average of the pixel values of the short-exposure image signal 23B to use as the short-exposure brightness threshold 41B, and the average of the pixel values of the long-exposure image signal 24B to use as the long-exposure brightness threshold 42B, which are used as the benchmark S381 of the high dynamic range synthesis step S382. After that, the high dynamic range synthesis step S382 is executed. In the high dynamic range synthesis step S382, the image processing module 12B defines the pixel values higher than the short-exposure brightness threshold 41B in the short-exposure image signal 23B as 1 according to the short-exposure brightness threshold 41B, and defines pixel values lower than or equal to the short-exposure brightness threshold 41B in the short-exposure image signal 23B as 0; the image processing module 12B defines the pixel values higher than the long-exposure brightness threshold 42B in the long-exposure image signal 24B as 1 according to the long-exposure brightness threshold 42B, and defines the pixel values in the long-exposure image signal 24B lower than or equal to the long-exposure brightness threshold 42B as 0. Finally, the weighted calculation step S383 is executed, and the image processing module 12B multiplies the binarized short-exposure image signal 23B by a short-exposure weight 43B, and multiplies the binarized long-exposure image signal 24B by a long-exposure weight 44B to generate a new short-exposure image signal 233 and a long-exposure image signal 243, wherein the long-exposure weight 44B is greater than the short-exposure weight 43B.

It can be understood that, in the present embodiment, the short-exposure brightness threshold 41B and the long-exposure brightness threshold 42B are generated by averaging the pixel values of the short-exposure image signal 23B and the long-exposure image signal 24B, The short-exposure brightness threshold 41B and the long-exposure brightness threshold 42B are used as the benchmark for the subsequent high dynamic range synthesis step S382, so that the present invention can use the actually generated pixel value (that is, the brightness of the environment) as the benchmark for binarization so as to increase the sensitivity of the image processing module 12B of the present invention to the brightness of the dynamic image, and to generate a dynamic image with better bright details, but the present invention is not limited thereto. For example, the short-exposure brightness threshold 41B and the long-exposure brightness threshold 42B of the present invention can also be stored in the image processing module 12B in advance by means of statistical calculations, so as to meet most usage environments, thereby reducing the computing cost of the image processing module 12B, while effectively saving the power of electronic devices. The users can choose whichever method is more appropriate according to the needs.

Thus, the dynamic image sensor according to the second embodiment of the present invention senses the brightness in the environment through the brightness sensing module 13B, so that the image processing module 12B can adjust the pinch lower limit and pinch upper limit according to the brightness sensed by the brightness sensing module 13B, and greatly reduces the calculation time of image processing module 12B to generate the optimal short-exposure time and optimal long-exposure time, as well as realizes the dynamic image that is most suitable according to the current environment. Thereby, the present invention provides wide applicability. In addition, according to the tone mapping method of the second embodiment of the present invention, the short-exposure image signal 23B and the long-exposure image signal 24B are processed through binarization, and the binarized short-exposure image signal is multiplied by the short-exposure weight 43B, the binarized long-exposure image signal 24B is multiplied by the long-exposure weight 44B, wherein the long-exposure weight 44B is greater than the short-exposure weight 43B. As such, the problem of unclear dynamic images in low-brightness environments is solved, so that the high pixels in the original pixel have higher values and the low pixels in the original pixel have lower values, so that the contrast of the outline of the object in the image is increased, and the clarity of the dynamic image is further improved.

Figure 13:
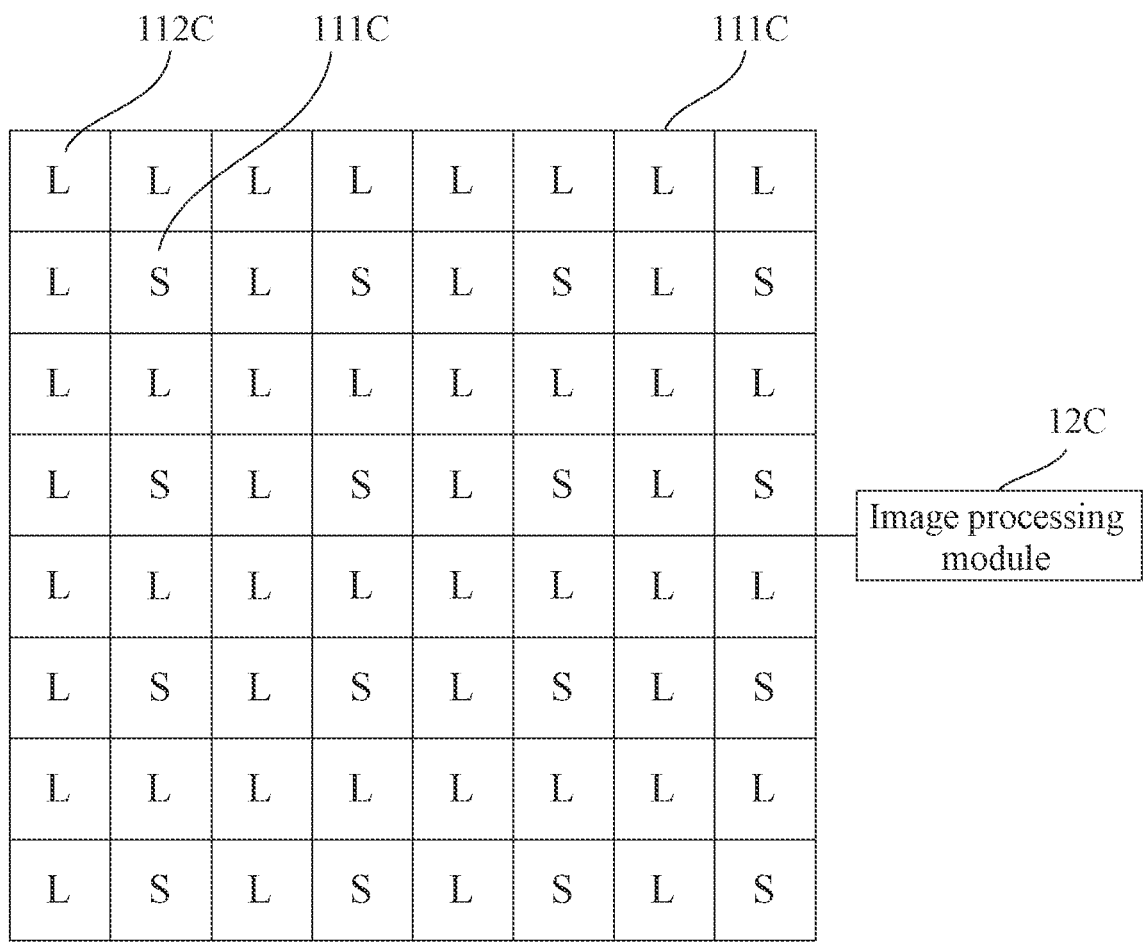
FIG. 13 is a schematic view of a dynamic image sensor according to a third embodiment of the present invention.

Refer to FIG. 13, which is a schematic view of a dynamic image sensor according to a third embodiment of the present invention. As shown in FIG. 13, the dynamic image sensor 100C according to the present invention includes: a sensing array 11C and an image processing module 12C. Compared with the first embodiment, the third embodiment of the present invention is mainly different in that the number of the first exposure pixels 111C of the sensing array 11C is ⅓ times the number of the second exposure pixels 112C, but not limited thereto. Relevant descriptions of the present embodiment may refer to the foregoing embodiment, and details are not repeated here.

Figure 14:
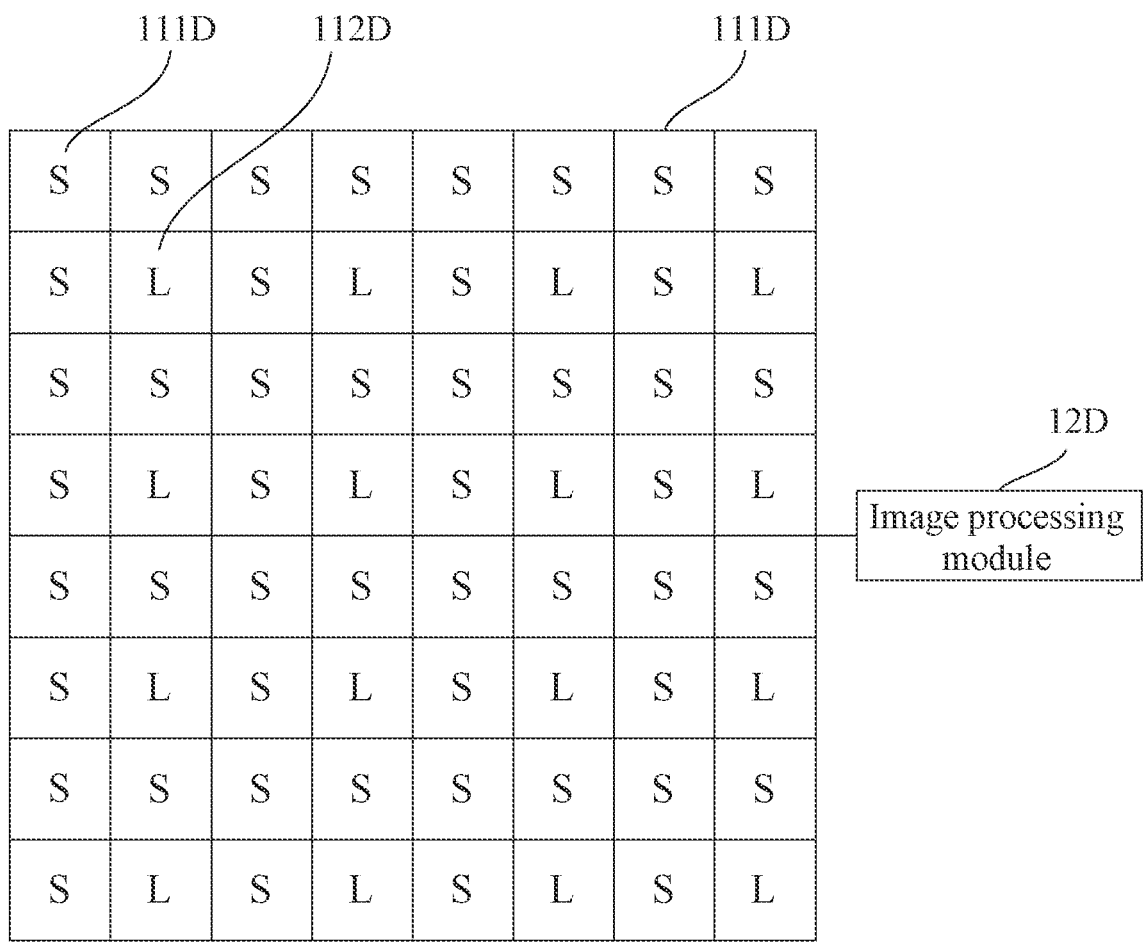
FIG. 14 is a schematic view of a dynamic image sensor according to a fourth embodiment of the present invention.

Refer to FIG. 14, which is a schematic view of a dynamic image sensor according to a fourth embodiment of the present invention. As shown in FIG. 14, the dynamic image sensor 100D according to the present invention includes: a sensing array 11D and an image processing module 12D. Compared with the first embodiment, the fourth embodiment of the present invention mainly differs in that the number of the first exposure pixels 111D of the sensing array 11D is three times the number of the second exposure pixels 112D, but not limited thereto. Relevant descriptions of the present embodiment may refer to the foregoing embodiment, and details are not repeated here.

It can be understood that the number of the first exposure pixels 111D and the second exposure pixels 112D can be adjusted according to the needs of the user, without greatly affecting the steps of the method for generating a dynamic image provided by the present invention, and those with ordinary knowledge in the technical field of the present invention can make various changes and adjustments based on the above examples, which will not be listed one by one here.

Refer to FIG. 15, which is a schematic view of a dynamic image sensor according to a fifth embodiment of the present invention. As shown in FIG. 15, the dynamic image sensor 100E according to the present invention includes: a sensing array 11E and an image processing module 12E. Compared with the first embodiment, the fifth embodiment of the present invention mainly differs in that the sensing array 11E according to the fifth embodiment of the present invention may include first exposure pixels 111E, long-exposure pixels 112E, and medium-exposure pixels 113E, wherein, the medium-exposure pixel 113E has a medium-exposure time, the length of the medium-exposure time is between the short-exposure time and the long-exposure time, and the ratio of the number of the first exposure pixel 111E, the long-exposure pixel 112E, and the medium exposure pixel 113E is 1:1:2, but not limited to thereto. Relevant descriptions of the present embodiment may refer to the foregoing embodiment, and details are not repeated here. As such, the present invention further provides a dynamic image sensor with three different exposures and different exposure times, so that it can further perform exposure fusion on the image information in the same frame time for different environments that are not simultaneously exposed and for different exposure times, achieves effects such as enhancing the definition and brightness of dynamic images, and further improves the applicability of the dynamic image sensor of the present invention.

Figure 16:
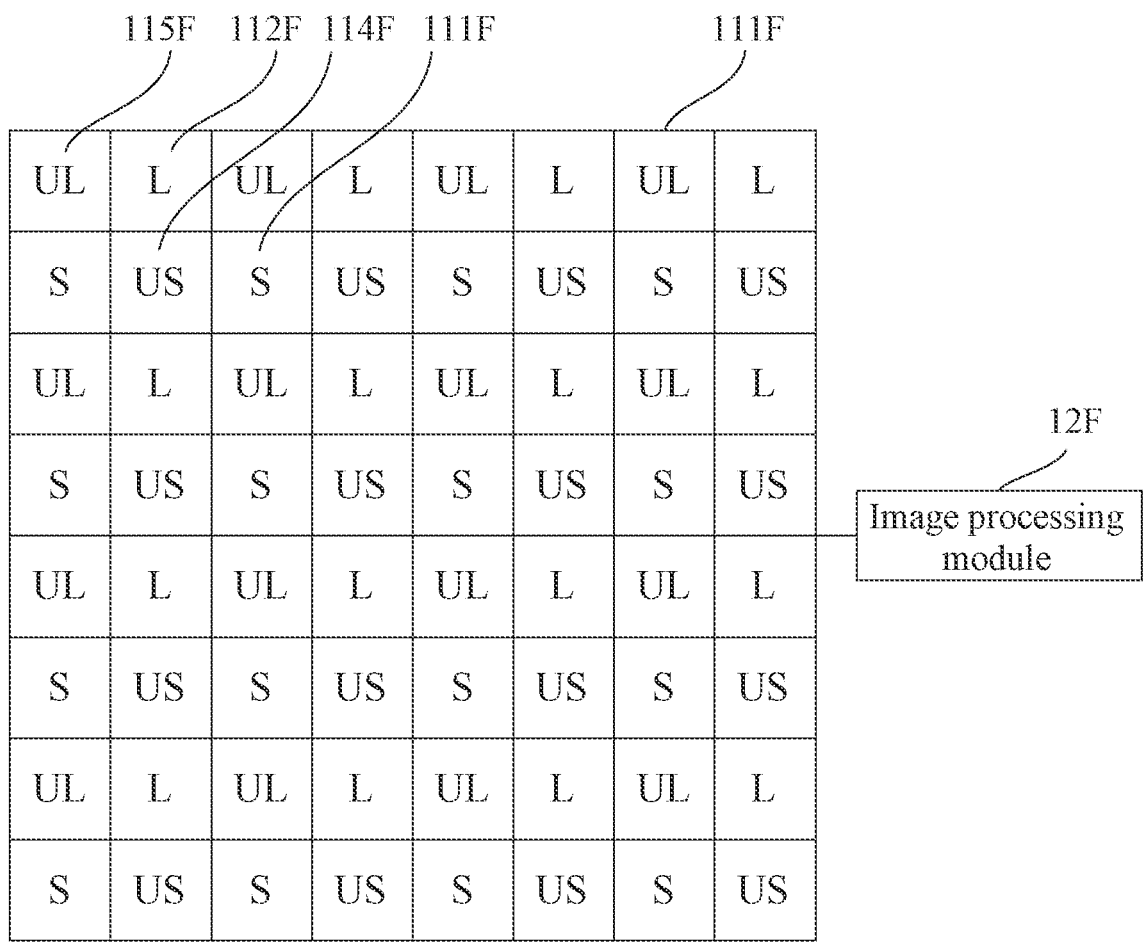
FIG. 16 is a schematic view of a dynamic image sensor according to a sixth embodiment of the present invention.

Refer to FIG. 16, which is a schematic view of a dynamic image sensor according to a sixth embodiment of the present invention. As shown in FIG. 16, the dynamic image sensor 100F according to the present invention includes: a sensing array 11F and an image processing module 12F. Compared with the first embodiment, the sixth embodiment of the present invention is mainly different in that the sensing array 11E according to the sixth embodiment of the present invention may include first exposure pixels 111F, long-exposure pixels 112F, extremely short-exposure pixels 114F, and extremely long-exposure pixels 115F, wherein, the extremely short-exposure pixels 114F have an extremely short-exposure time, the extremely long-exposure pixel 115F has an extremely long-exposure time, and the length of the extremely short-exposure time is smaller than the short-exposure time, the extremely long-exposure time is longer than the long-exposure time, and the numbers of the first exposure pixels 111F, the long-exposure pixels 112F, the extremely short-exposure pixels 114F, and the extremely long-exposure pixels 115F are the same, but not limited thereto. Relevant descriptions of the present embodiment may refer to the foregoing embodiment, and details are not repeated here. As such, the present invention further provides a dynamic image sensor with four different exposures and different exposure times, so that it enables to further perform exposure fusion on the image information exposed at different times and for different exposure times in the same frame for environments with extreme brightness, so as to achieve the effects of enhancing the clarity and brightness of dynamic images, and further enhance the applicability of dynamic image sensor of the present invention.

Thus, the present invention has the following implementation effects and technical effects:

First, based on the dynamic image sensor of the present invention, and with the dynamic image generating method provided by the present invention, the first exposure pixel is exposed for a short-exposure time, while the second exposure pixel is exposed for a long-exposure time, and the high dynamic range image information is generated through tone mapping and exposure fusion. As such, the present invention utilizes the design of long- and short-exposure arrays to perform exposure fusion on the image information exposed at different times and for different exposure times in the same frame time to achieve the effects of enhancing the clarity and brightness of dynamic images, and greatly improving the accuracy of the identification algorithm for identifying dynamic images to reduce the risk of accidents.

Second, based on the dynamic image sensor of the present invention, combined with the dynamic image generating method provided by the present invention, the default short-exposure time is increased by the short-exposure fixed value to form a new default short-exposure time, or the default long-exposure time is reduced by the long-exposure fixed value to form a new default long-exposure time, so as to generate the optimal short-exposure time and the optimal long-exposure time. As such, the present invention exchanges the spatial resolution for additional exposure information, which is beneficial to converge to the optimal exposure time in a short period of time, so that the exposure of high dynamic range image information is good. In addition, through the computing method of pinching, the automatic exposure time method of the present invention can realize a dynamic calculation method to generate the optimal exposure time to adapt to various shooting environments, and at the same time reduce the computing time for generating the optimal exposure time, greatly improving the cost, efficiency and applicability of the invention.

Third, the tone mapping according to the dynamic image generation method of the present invention is different from the tone mapping algorithm of the prior art. The short-exposure image signal and the long-exposure image signal are processed through binarization, and the binarized short-exposure image signal is multiplied by the short-exposure weight, and the binarized long-exposure image signal is multiplied by the long-exposure weight, wherein the long-exposure weight is greater than the short-exposure weight. This solves the problem of unclear dynamic images in low-brightness environments, making the pixels with high brightness have higher values and those with low brightness lower, which increases the contrast of object outlines in the image and further improves the clarity of dynamic images.

The above is to illustrate the implementation of the present invention by means of specific examples. Those skilled in the art can easily understand other advantages and effects of the present invention from the content disclosed in this specification.

The above are only preferred embodiments of the present invention, and are not intended to limit the scope of the present invention; all other equivalent changes or modifications that do not depart from the spirit disclosed by the present invention should be included in the following within the scope of the patent.

What is claimed is:

1. A dynamic image generating method for images with a high frame rate and a high dynamic range, applicable to an environment having a dynamic image sensor receiving a dynamic image in the dynamic range, and the dynamic image sensor comprising a first exposure pixel, a second exposure pixel, and an image processing module, the first exposure pixel and the second exposure pixel being coupled to the image processing module, the dynamic image generating method comprising the following steps of:

a simultaneous exposure step, exposing the first exposure pixel for a short-exposure time to generate a short-exposure image signal, and exposing the second exposure pixel for a long-exposure time to generate a long-exposure image signal;

a tone mapping step, with the image processing module executing a tone mapping algorithm on the short-exposure image signal and the long-exposure image signal to generate short-exposure image information and long-exposure image information;

an exposure fusion step, with the image processing module executing exposure fusion on the short-exposure image information and the long-exposure image information to generate high dynamic range image information; and an output step, with the image processing module outputting the high dynamic range image information;

wherein, before the simultaneous exposure step, the dynamic image generating method further comprises an automatic exposure time method, the automatic exposure time method comprising the following steps of:

a test step, exposing the first exposure pixel for a default short-exposure time, and exposing the second exposure pixel for a default long-exposure time, so as to generate a default short-exposure image signal and a default long-exposure image signal;

a determination step, with the image processing module confirming whether the default short-exposure image signal is higher than a lower limit of pinching, and confirming whether the default long-exposure image signal is lower than an upper limit of pinching;

an adjustment step, with the image processing module increasing the default short-exposure time by a short-exposure fixed value to generate a new default short-exposure time, or decreasing the default long-exposure time by a long-exposure fixed value to generate a new default long-exposure time; and an optimal exposure time generation step, with the image processing module generating an optimal short-exposure time and an optimal long-exposure time according to the default short-exposure time and the default long-exposure time;

wherein if the determination step determines that the default short-exposure image signal is higher than the lower limit of pinching, and the default long-exposure image signal is lower than the upper limit of pinching, the dynamic image generating method executes the optimal exposure time generation step after the determination step, and in the simultaneous exposure step, exposes the first exposure pixel for the optimal short-exposure time, and simultaneously exposes the second exposure pixel for the optimal long-exposure time; otherwise, the dynamic image generating method executes the adjustment step after the determination step and repeats the test step; and wherein the dynamic image sensor further includes a brightness sensing module coupled to the image processing module, the brightness sensing module is used to sense brightness of the environment where the dynamic image sensor is located; the automatic exposure time method further includes an upper and lower limit adjustment step in which the image processing module adjusts the lower limit and the upper limit of pinching according to the brightness sensed by the brightness sensing module; when the brightness sensed by the brightness sensing module is lower than a low-brightness value, the lower limit of pinching is correspondingly reduced, and when the brightness sensed by the brightness sensing module is higher than a high-brightness value, the upper limit of pinching is raised accordingly.

2. The dynamic image generating method according to claim 1, wherein the tone mapping algorithm is selected from one of a gamma curve algorithm and an Academy Color Encoding System curve algorithm.

3. The dynamic image generating method according to claim 1, wherein for the automatic exposure time method, the dynamic image sensor stores a short-exposure time upper limit and a long-exposure time lower limit, the short-exposure time upper limit is a maximum value of the default short-exposure time, and the long-exposure time lower limit is a minimum value of the default long-exposure time.

4. The dynamic image generating method according to claim 3, wherein for the automatic exposure time method, if the default short-exposure time is equal to the short-exposure time upper limit, and the default short-exposure image signal is still lower than the lower limit of pinching in the determination step, the automatic exposure time method further includes a superposition step, in which the image processing module performs superposition on the default short-exposure image signal to generate the short-exposure image signal.

5. A dynamic image generating method for images with a high frame rate and a high dynamic range, applicable to an environment having a dynamic image sensor receiving a dynamic image in the dynamic range, and the dynamic image sensor comprising a first exposure pixel, a second exposure pixel, and an image processing module, the first exposure pixel and the second exposure pixel being coupled to the image processing module, the dynamic image generating method comprising the following steps of:

a simultaneous exposure step, exposing the first exposure pixel for a short-exposure time to generate a short-exposure image signal, and exposing the second exposure pixel for a long-exposure time to generate a long-exposure image signal;

a tone mapping step, with the image processing module executing a tone mapping algorithm on the short-exposure image signal and the long-exposure image signal to generate short-exposure image information and long-exposure image information;

an exposure fusion step, with the image processing module executing exposure fusion on the short-exposure image information and the long-exposure image information to generate high dynamic range image information; and an output step, with the image processing module outputting the high dynamic range image information;

wherein, before the simultaneous exposure step, the dynamic image generating method further comprises an automatic exposure time method, the automatic exposure time method comprising the following steps of:

a test step, exposing the first exposure pixel for a default short-exposure time, and exposing the second exposure pixel for a default long-exposure time, so as to generate a default short-exposure image signal and a default long-exposure image signal;

a determination step, with the image processing module confirming whether the default short-exposure image signal is higher than a lower limit of pinching, and confirming whether the default long-exposure image signal is lower than an upper limit of pinching;

an adjustment step, with the image processing module increasing the default short-exposure time by a short-exposure fixed value to generate a new default short-exposure time, or decreasing the default long-exposure time by a long-exposure fixed value to generate a new default long-exposure time; and an optimal exposure time generation step, with the image processing module generating an optimal short-exposure time and an optimal long-exposure time according to the default short-exposure time and the default long-exposure time;

wherein if the determination step determines that the default short-exposure image signal is higher than the lower limit of pinching, and the default long-exposure image signal is lower than the upper limit of pinching, the dynamic image generating method executes the optimal exposure time generation step after the determination step, and in the simultaneous exposure step, exposes the first exposure pixel for the optimal short-exposure time, and simultaneously exposes the second exposure pixel for the optimal long-exposure time; otherwise, the dynamic image generating method executes the adjustment step after the determination step and repeats the test step; and wherein the tone mapping step further comprises:

a threshold value generation step, with the image processing module taking an average of pixel values of the short-exposure image signal to generate a short-exposure brightness threshold, and taking an average of pixel values of the long-exposure image signal to generate a long-exposure brightness threshold;

a high dynamic range synthesis step, with the image processing module, according to the short-exposure brightness threshold, defining the pixel values higher than the short-exposure brightness threshold in the short-exposure image signal as 1, and defining the pixel values in the short-exposure image signal lower than or equal to the short-exposure brightness threshold as 0, and the image processing module, according to the long-exposure brightness threshold, defining the pixel values in the long-exposure image signal higher than the long-exposure brightness threshold as 1, and defining the pixel values in the long-exposure image signal lower than or equal to the long-exposure brightness threshold as 0; and a weighted calculation step, with the image processing module multiplying a binarized short-exposure image signal by a short-exposure weight, and multiplying a binarized long-exposure image signal by a long-exposure weight, wherein the long-exposure weight is greater than the short-exposure weight.

6. A dynamic image generating method for images with a high frame rate and a high dynamic range, applicable to an environment having a dynamic image sensor receiving a dynamic image in the dynamic range, and the dynamic image sensor comprising a first exposure pixel, a second exposure pixel, and an image processing module, the first exposure pixel and the second exposure pixel being coupled to the image processing module, the dynamic image generating method comprising the following steps of:

a simultaneous exposure step, exposing the first exposure pixel for a short-exposure time to generate a short-exposure image signal, and exposing the second exposure pixel for a long-exposure time to generate a long-exposure image signal;

a tone mapping step, with the image processing module executing a tone mapping algorithm on the short-exposure image signal and the long-exposure image signal to generate short-exposure image information and long-exposure image information;

an exposure fusion step, with the image processing module executing exposure fusion on the short-exposure image information and the long-exposure image information to generate high dynamic range image information; and an output step, with the image processing module outputting the high dynamic range image information;

wherein, before the simultaneous exposure step, the dynamic image generating method further comprises an automatic exposure time method, the automatic exposure time method comprising the following steps of:

a test step, exposing the first exposure pixel for a default short-exposure time, and exposing the second exposure pixel for a default long-exposure time, so as to generate a default short-exposure image signal and a default long-exposure image signal;

a determination step, with the image processing module confirming whether the default short-exposure image signal is higher than a lower limit of pinching, and confirming whether the default long-exposure image signal is lower than an upper limit of pinching;

an adjustment step, with the image processing module increasing the default short-exposure time by a short-exposure fixed value to generate a new default short-exposure time, or decreasing the default long-exposure time by a long-exposure fixed value to generate a new default long-exposure time; and an optimal exposure time generation step, with the image processing module generating an optimal short-exposure time and an optimal long-exposure time according to the default short-exposure time and the default long-exposure time;

wherein if the determination step determines that the default short-exposure image signal is higher than the lower limit of pinching, and the default long-exposure image signal is lower than the upper limit of pinching, the dynamic image generating method executes the optimal exposure time generation step after the determination step, and in the simultaneous exposure step, exposes the first exposure pixel for the optimal short-exposure time, and simultaneously exposes the second exposure pixel for the optimal long-exposure time; otherwise, the dynamic image generating method executes the adjustment step after the determination step and repeats the test step; and wherein for the automatic exposure time method, the dynamic image sensor stores a short-exposure time upper limit and a long-exposure time lower limit, the short-exposure time upper limit is a maximum value of the default short-exposure time, the long-exposure time lower limit is a minimum value of the default long-exposure time, and if the default short-exposure time is equal to the short-exposure time upper limit, and the default short-exposure image signal is still lower than the lower limit of pinching in the determination step, the automatic exposure time method further includes a superposition step in which the image processing module performs superposition on the default short-exposure image signal to generate the short-exposure image signal.

* * * * *